US010895953B2

(12) United States Patent
Liu et al.

(10) Patent No.: US 10,895,953 B2
(45) Date of Patent: Jan. 19, 2021

(54) INTERACTION WITH A THREE-DIMENSIONAL INTERNET CONTENT DISPLAYED ON A USER INTERFACE

(71) Applicant: Tencent Technology (Shenzhen) Company Limited, Shenzhen (CN)

(72) Inventors: Simin Liu, Shenzhen (CN); Jianxin Huang, Shenzhen (CN); Liang Guo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/544,629

(22) Filed: Aug. 19, 2019

(65) Prior Publication Data
US 2019/0369840 A1 Dec. 5, 2019

Related U.S. Application Data

(63) Continuation of application No. PCT/CN2017/095179, filed on Jul. 31, 2017.

(51) Int. Cl.
G06F 3/0481 (2013.01)
G06F 3/0484 (2013.01)

(52) U.S. Cl.
CPC ...... G06F 3/04815 (2013.01); G06F 3/04845 (2013.01)

(58) Field of Classification Search
CPC ............. G06F 3/04815; G06F 3/04845; G06F 2200/1637

(Continued)

(56) References Cited

U.S. PATENT DOCUMENTS

2002/0101457 A1 8/2002 Lang
2015/0082181 A1* 3/2015 Ames .................. G06F 3/0487
715/738
2015/0169171 A1* 6/2015 Fotland ................ G06F 3/0304
715/835

FOREIGN PATENT DOCUMENTS

CN 101598980 A 12/2009
CN 101710917 A 5/2010
(Continued)

OTHER PUBLICATIONS

Tencent Technology, IPRP, PCT/CN2017/095179, dated Feb. 4, 2020, 5 pgs.

(Continued)

Primary Examiner — Tadesse Hailu
Assistant Examiner — Darrin Hope
(74) Attorney, Agent, or Firm — Morgan, Lewis & Bockius LLP

(57) ABSTRACT

The present application provides internet browsing especially a three dimensional webpage browsing methods and systems by using the movement of a computing device with a display. By moving the computing device, a user changes the location and the orientation of the computing device, and thus interacts with at least one information item in a first web page. The computing device measures the location difference and the orientation difference between the computing device and the information item, and determines whether each of the location difference and the orientation difference is within a threshold, respectively. If both the location and orientation differences are within the threshold for a predetermined time, the user is directed to a second web page.

20 Claims, 8 Drawing Sheets

(58) Field of Classification Search
USPC .......................................................... 715/738
See application file for complete search history.

(56) References Cited

FOREIGN PATENT DOCUMENTS

| | | |
|---|---|---|
| CN | 102272690 A | 12/2011 |
| CN | 102385468 A | 3/2012 |
| CN | 102662577 A | 9/2012 |
| CN | 103092350 A | 5/2013 |
| CN | 104040457 A | 9/2014 |
| CN | 105190504 A | 12/2015 |
| WO | WO 2006036069 A1 | 4/2006 |

OTHER PUBLICATIONS

Tencent Technology, ISRWO, PCT/CN2017/095179, dated May 2, 2018, 8 pgs.

* cited by examiner

US 10,895,953 B2

INTERACTION WITH A THREE-DIMENSIONAL INTERNET CONTENT DISPLAYED ON A USER INTERFACE

CROSS-REFERENCE TO RELATED APPLICATION

This application is a continuation application of PCT/CN2017/095179, entitled "INTERACTION WITH A THREE-DIMENSIONAL INTERNET CONTENT DISPLAYED ON A USER INTERFACE" filed on Jul. 31, 2017, which is incorporated by reference in its entirety.

TECHNICAL FIELD

The disclosed implementations relate generally to the field of Internet technologies, and in particular, to a three-dimensional internet browsing and interaction method and a system implementing the method.

BACKGROUND

With the growing popularity of Internet applications, the ways a user interacts with the Internet have become an important part in the Internet navigation, and a user expects to use the Internet in a convenient and interesting way. For example, when a user is interacting with a web page, the user usually clicks an item on the web page (e.g., by mouse or finger touch) to navigate to a next web page. Other methods of interaction especially on a computing device include sliding a web page or shake the computing device displaying the web page.

The traditional mobile three dimensional (3D) model in a web page is typically constructed on Canvas element. And often the Canvas element would cover the full display of the computing device, and therefore clicking on a 3D model on the display has the same effect as clicking on the Canvas element. As a result, the clicking area can cover the whole screen of the display and is hard to control. By using the traditional web page interaction methods, it is hard to determine the user interaction area outside the 3D model.

SUMMARY

An objective of the present application is to provide a web page browsing method by using the movement of a computing device, so as to control the interaction area and facilitate the operation of a user during the interaction with a 3D model.

In order to achieve the foregoing beneficial effects, the present application is directed to a method for browsing a web page using a computing device having a display, one or more processors and memory storing one or more programs for execution by the one or more processors, which includes the following steps: rendering, on the display, a first web page including a plurality of information items, each information item having a fixed location and a fixed orientation and linking to a second web page; displaying, on the display, an interested area mark, the interested area mark having a predefine size, a variable location and a variable orientation both in accordance with a current orientation of the computing device; in response to a movement of the computing device: updating the location and orientation of the interested area mark until the interested area mark overlaps with a first of the plurality of information items; measuring a location difference and an orientation difference between the interested area mark and the first information item; and in accordance with a determination that each of the location difference and the orientation difference is within a respective threshold for a predefined time period: rendering, on the display, the second web page in replacement of the first web page.

In an implementation of the present application, the interested area mark is displayed at a fixed positon on the display.

In an implementation of the present application, the movement of the computing device includes moving the interested area mark in an opposite direction within the first web page to a direction of the orientation of the computing device.

In an implementation of the present application, the determination that each of the location difference and the orientation difference is within the respective threshold for the predefined time period includes holding the computing device substantially steady for the predefined time period.

In an implementation of the present application, the first web page includes a 3D (three-dimensional) webpage.

In an implementation of the present application, the first web page includes a multimedia content.

In an implementation of the present application, the first information item includes at least one of: a textual content and an image.

In an implementation of the present application, the first information item is displayed within the predefined size of the interested area mark.

In an implementation of the present application, the first information item is displayed at a size larger than the predefined size of the interested area mark.

In an implementation of the present application, the first information item includes a 3D model.

In an implementation of the present application, the first information item includes a first shape and a second shape. The first shape changes into the second shape in accordance with a determination that each of the location difference and the orientation difference between the interested area mark and the first shape is within a respective threshold for a first predefined time period.

In an implementation of the present application, the step of rendering, on the display, the second web page, further includes rendering the second web page in accordance with a determination that each of the location difference and the orientation difference between the interested area mark and the second shape is within a respective threshold for a second predefined time period.

In an implementation of the present application, the predefined time period is 3 seconds.

In an implementation of the present application, the step of displaying, on the display, the interested area mark further includes: varying a displaying characteristic of the interested area mark during the predefined time period, thereby indicating, to a user of the computing device, a length for which the computing device has been held substantially stable.

Another objective of the present application is to provide a computing device, so as to control the web browsing interaction area and facilitate the operation of a user during the interaction with a 3D web page on a display terminal.

In order to achieve the foregoing beneficial effects, the present application is directed to a computing device, which includes: a display; one or more processors; and memory having instructions stored thereon, which when executed by the one or more processors cause the processors to perform operations, which include the following steps: rendering, on the display, a first web page including a plurality of information items, each information item having a fixed location and a fixed orientation and linking to a second web page; displaying, on the display, an interested area mark, the interested area mark having a predefine size, a variable location and a variable orientation both in accordance with a current orientation of the computing device; in response to a movement of the computing device: updating the location and orientation of the interested area mark until the interested area mark overlaps with a first of the plurality of information items; measuring a location difference and an orientation difference between the interested area mark and the first information item; and in accordance with a determination that each of the location difference and the orientation difference is within a respective threshold for a predefined time period: rendering, on the display, the second web page in replacement of the first web page.

In accordance with some implementations of the present application, a non-transitory computer-readable medium, having instructions stored thereon, which when executed by one or more processors cause the processors to perform operations, which include the following steps: rendering, on a display, a first web page including a plurality of information items, each information item having a fixed location and a fixed orientation and linking to a second web page; displaying, on the display, an interested area mark, the interested area mark having a predefine size, a variable location and a variable orientation both in accordance with a current orientation of a computing device; in response to a movement of the computing device: updating the location and orientation of the interested area mark until the interested area mark overlaps with a first of the plurality of information items; measuring a location difference and an orientation difference between the interested area mark and the first information item; and in accordance with a determination that each of the location difference and the orientation difference is within a respective threshold for a predefined time period: rendering, on the display, the second web page in replacement of the first web page.

Other features and advantages of the present application can become apparent from the following detailed description, taken in conjunction with the accompanying drawings, demonstrating by way of examples the principles of the present application.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
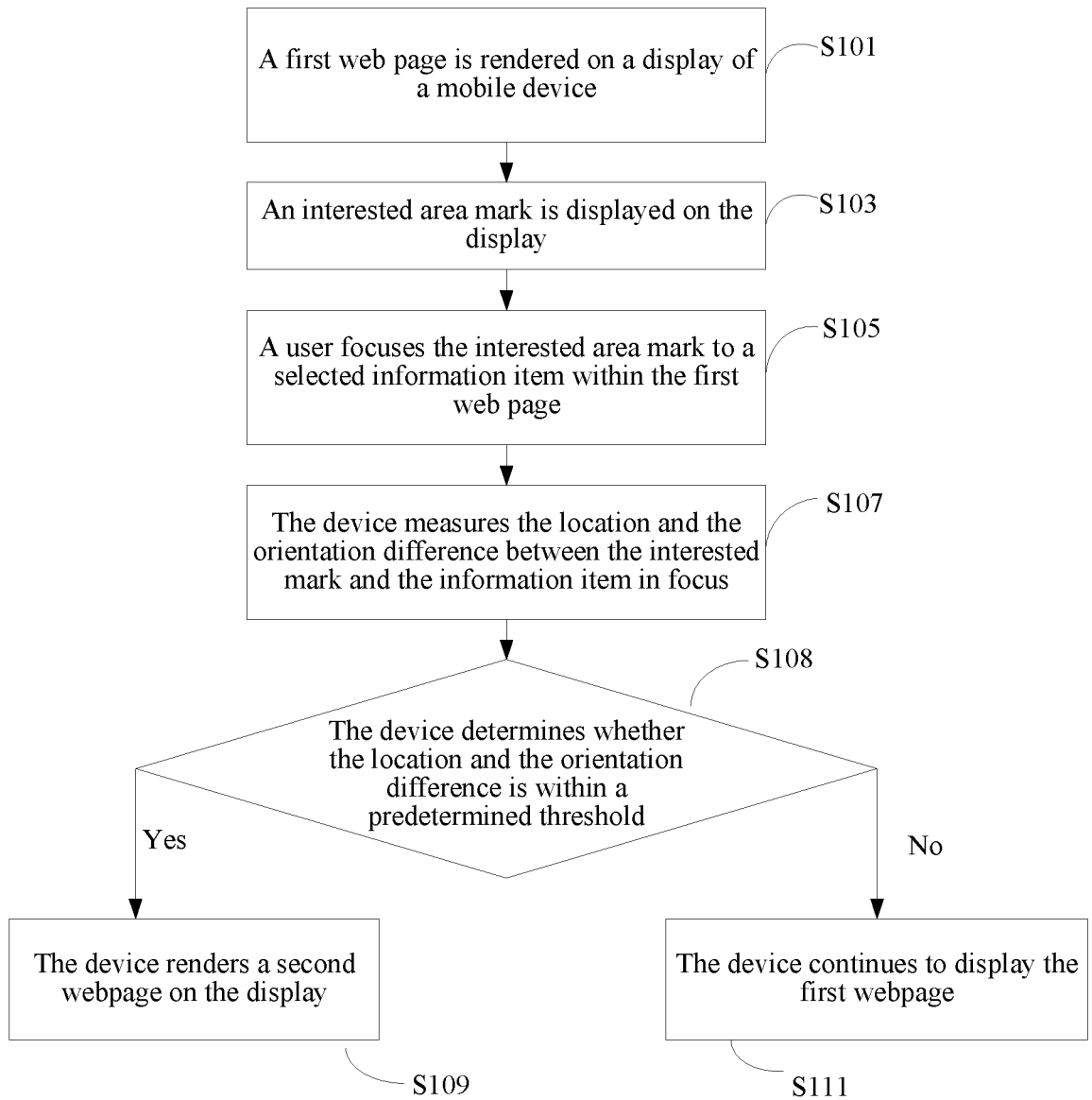
FIG. 1 is a schematic flow chart of an exemplary implementation of web page interaction method in accordance with some implementations of the present application.

The description of the following implementations refers to the accompanying drawings, so as to illustrate specific implementations that may be implemented by the present application. Direction terminologies mentioned in the present application, such as "upper", "lower", "front", "rear", "left", "right", "inner", "outer", "side" are only used as reference of the direction of the accompany drawings. Therefore, the used direction terminology is only used to explain and understand the present application, rather than to limit the present application. In the figure, units with similar structures are represented in same reference numerals.

FIG. 1 is an exemplary schematic flow chart of an exemplary implementation of web page interaction method provided in the present application.

In Step S101, in some implementations, a first web page is rendered on a display of a computing device. The computing device can be a cell phone, a tablet, a (Personal Digital Assistant) PDA, or a computer. In some instances, the computing device can be any computing devices that can determine the orientation and/or the location of the computing device. In some instances, the first web page can be accessed through scanning a bar code using a camera on the computing device.

The first web page rendered on the display includes one or more information items. In some implementations, the information items include 3D models or objects. Each information item also includes a link to another web page. In some implementations, the first web page is a 3D web page. By changing the orientation of the computing device, for example, up and down, left and right, and front and back, the user can view the content of the first web page on a 360-degree basis. The effect of viewing the 3D web page content is the same as the view a user would see on the display through moving a digital camera, except the user does not need a real camera to view the 3D web page. In some instances, the first web page can include some non-information items such as contents and objects without linking to another web page. In some instances, the first web page contains some multimedia contents.

Each of the information items has a fixed location and a fixed orientation. In some implementations, the fixed location and fixed orientation of the information items are calculated relative to the orientation and location of the first 3D web page.

In Step S103, an interested area mark is displayed on the display. In some implementations, the interested area mark has a predefined size. In some implementations, the interested area mark has a fixed location on the display. In some implementations, as the user changes the orientation and/or location of the computing device, the relative position of the interested area mark changes within the first web page. Accordingly, the interested area mark has a variable location and a variable orientation relative to the first 3D web page, according to the current orientation and/or location of the computing device. The user can observe that the interested area mark moves in an opposite direction within the first web page to a direction of the orientation of the computing device. The computing device can update the location and orientation information of the interested area mark as the user moves the computing device. In some implementations, the interested area mark contains a reminder for the user to focus on an information item within the first web page.

In Step S105, in some implementations, the user focuses the interested area mark to a selected information item within the first web page. In some instances, the user holds his/her computing device substantially steady for a predetermined duration. For example, the user can hold the computing device for 1 second, 2 seconds, 3 seconds, or any reasonable amount of time, while focusing on the information item with the interested area mark.

In Step S107, in some implementations, when the interested area mark overlaps with the predetermined information item, the computing device measures the respective location and the orientation difference between the interested area mark and the information item in focus.

In Step S108, the computing device determines if each of the location and the orientation difference is within a predetermined threshold, such as within 10%, for the predetermined duration. In some implementations, the threshold can be 9%, 8%, 7%, 6%, 5%, 4%, 3%, 2%, or 1%. In some implementations, the threshold can be less than 10%. In some implementations, the threshold can be less than 20%. In some implementations, the threshold can be less than 30%. In some implementations, when the interested area mark's position is fixed on the display of the computing device, determining the location and orientation differences between the interested area mark and the information item are effectively the same as determining the location and orientation differences between the computing device and the information item.

In some implementations, the interested area mark also changes its display characteristics to indicate that the information item is in focus. For example, the interested area mark can change its color, change its display texts, or flash after the user focuses the interested area mark to the information item substantially stable for the predetermined duration.

In Step S109, after the computing device determines the respective location and orientation difference between the interested area mark and the information item is within a predetermined threshold, a second web page is rendered on the display. The user can navigate to different webpages without clicking an information item on the display. In some implementations, the second webpage can be a 2D webpage. In some implementations, the second web page can be a 3D webpage.

In Step S111, if the computing device determines each of the respective location and orientation difference between the interested area mark and the information item is not within a predetermined threshold, the first web page remains on the display.

In some implementations, there can be interim steps before the second web page is displayed. For example, after the computing device determines each of the respective location and orientation difference between the interested area mark and the information item is within a predetermined threshold, the information item changes its shape to another 3D model. The user can again repeat the steps from S103-S108, focusing the interested area mark to the second shape of the information item. If the computing device determines the location and orientation difference between the interested area mark and the second shape of the information item is within a predetermined threshold, the second web page is then displayed.

Figure 2A:
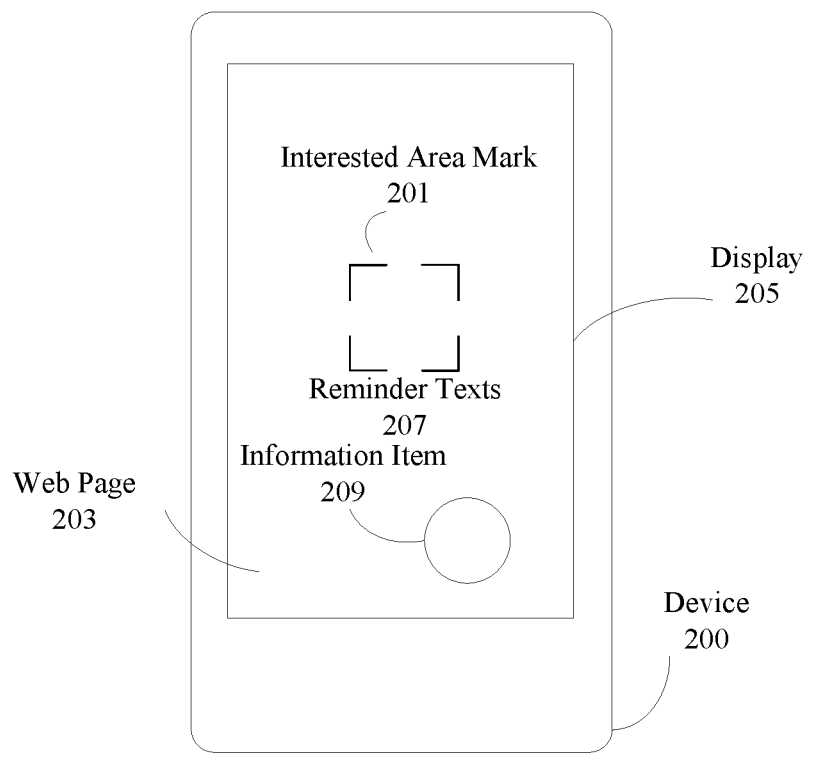
FIG. 2A is a schematic diagram showing an interested area mark within a 3D web page on a display of a computing device in accordance with some implementations of the present application.

FIG. 2A is an exemplary schematic diagram showing an interested area mark 201 within a 3D web page 203 on a display 205 of a computing device 200 as described in Step S103. Examples of a representative computing device 200 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. In one implementation as shown in FIG. 2A, the interested area mark 201 has a rectangular shape with lines on the four corners of the shape similar to a focus mark displayed on a camera. Some texts 207 are displayed around or on the interested area mark to remind the user to focus on an information item 209 in the first web page 203.

Figure 2B:
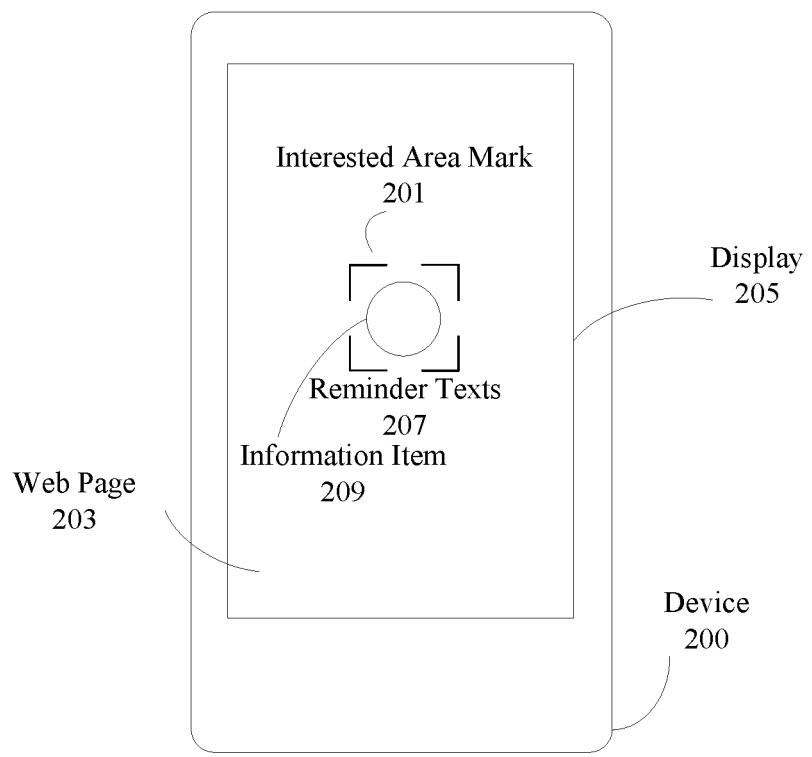
FIG. 2B is an exemplary schematic diagram showing an interested area mark focused on an information item within a 3D web page on a display in accordance with some implementations of the present application.

FIG. 2B is an exemplary schematic diagram showing an interested area mark 201 focused on an information item 209 within a 3D web page 203 on a display 205 of a computing device as described in Step S105. In one implementation as shown in FIG. 2B, the interested area mark 201 is aligned with the information item 209 in the first web page 203 as described in Steps S107 and S108.

Figure 3A:
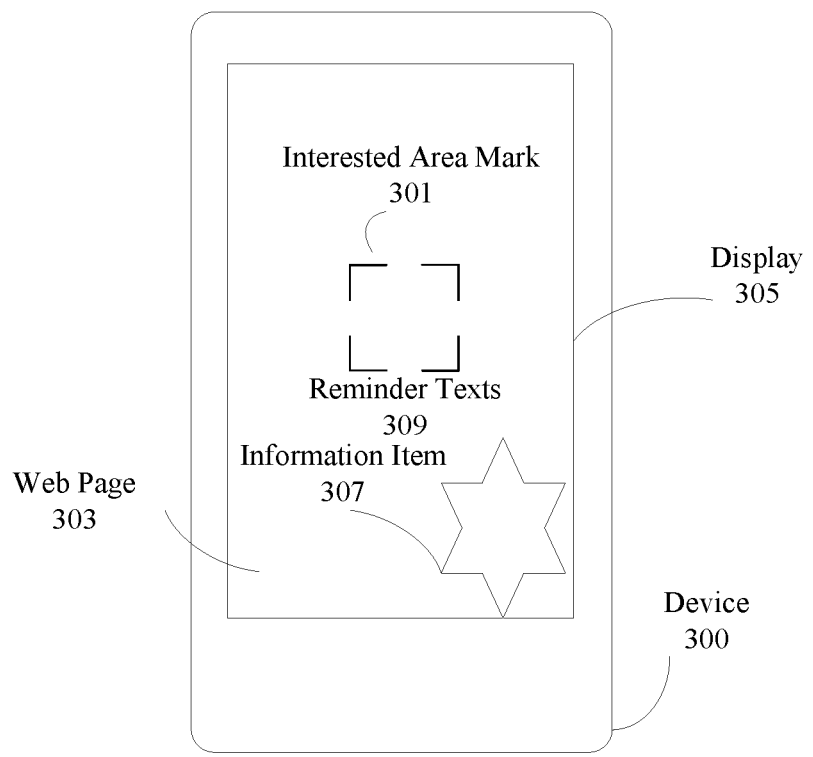
FIG. 3A is an exemplary schematic diagram showing an interested area mark within a 3D web page on a display, after the information item has changed its shape in accordance with some implementations of the present application.

FIG. 3A is an exemplary schematic diagram showing an interested area mark 301 within a 3D web page 303 on a display 305, after the information item 307 has changed to its second shape, according to Step S109. In one implementation as shown in FIG. 3A, the interested area mark 301 has a rectangular shape with lines on the four corners of the shape similar to a focus mark displayed on a camera. Some texts 309 are displayed around or on the interested area mark to remind the user to focus on the second shape of the information item 307 in the first web page 303 for a predetermined time. In one example, the second shape of the information item 307 has a size bigger than the interested area mark 301.

Figure 3B:
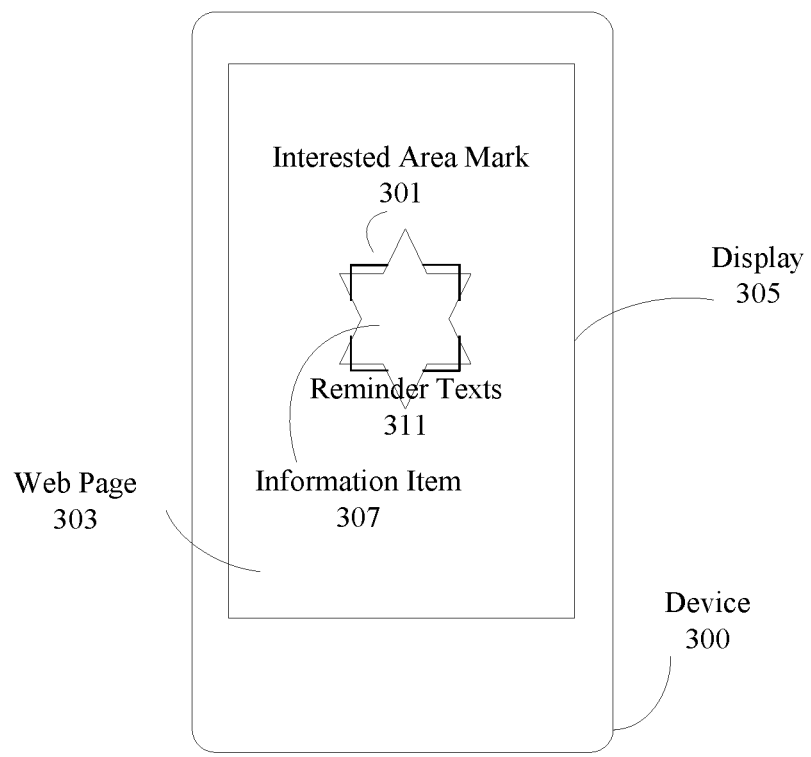
FIG. 3B is an exemplary schematic diagram showing an interested area mark focused on the second shape of the information item within a 3D web page on a display in accordance with some implementations of the present application.

FIG. 3B is an exemplary schematic diagram showing an interested area mark 301 focused on the second shape of the information item 307 within a 3D web page 303 on a display 305, according to Step S109. In one implementation as shown in FIG. 3B, some texts 311 are displayed around or on the interested area mark to remind the user the remaining time needed to focus on the second shape of the information item 307 in the first web page 303. After the user holds the computing device 300 stable for a predetermined time while focusing on the second shape of the information item 307, according to Step S109, in one implementation as shown in FIG. 3B, the reminder texts 311 displayed around or on the interested area mark are updated to inform the user the interested area mark 301 is successfully aligned with the second shape of the information item 307 in the first web page 303.

Figure 4:
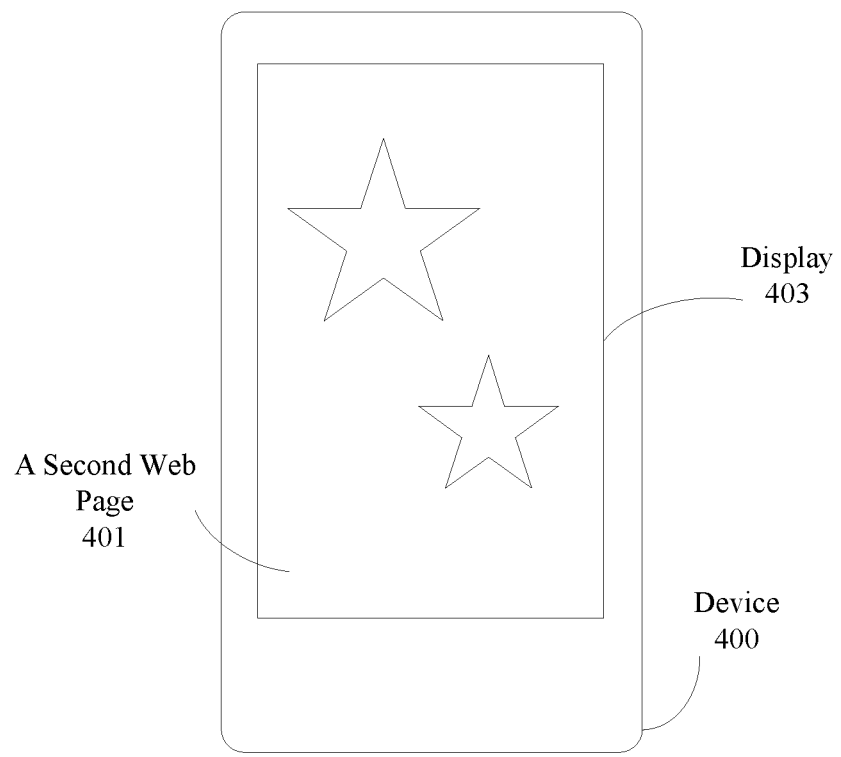
FIG. 4 is an exemplary schematic diagram showing a new web page on a display after the successful alignment between the interested area mark and the information item on the first web page in accordance with some implementations of the present application.

FIG. 4 is an exemplary schematic diagram showing a new web page or a second web page 401 on a display 403 after the successful alignment between the interested area mark and the information item on the first web page, according to Step S109.

Figure 5:
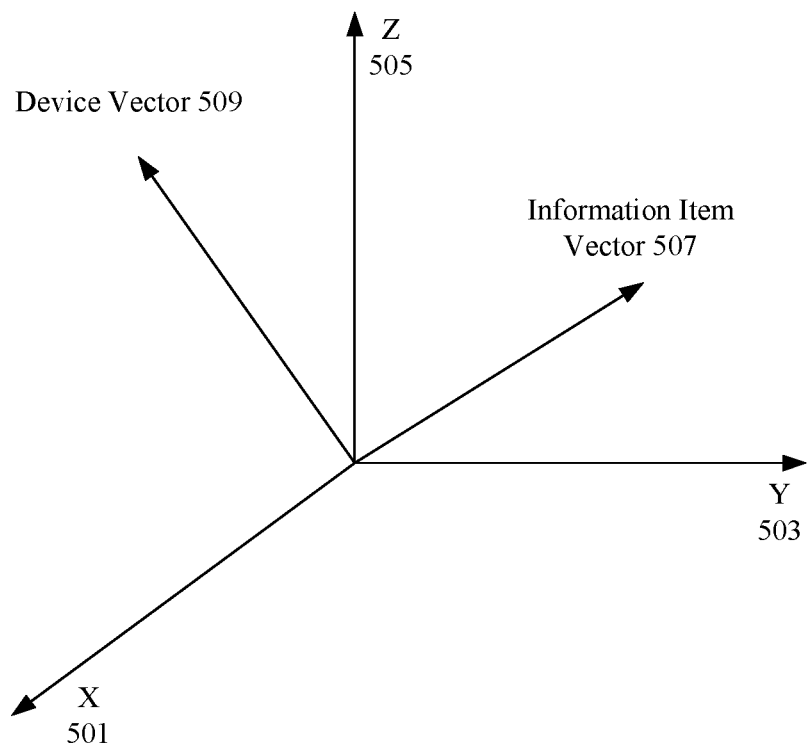
FIG. 5 is an exemplary schematic diagram illustrating the method of determining the location and the orientation difference, respectively, between the information item and the computing device in accordance with some implementations of the present application.

FIG. 5 is an exemplary schematic diagram illustrating the method of determining the location and the orientation difference, respectively, between the information item and the computing device as described in Steps S107 and S108. The x (501), y (503), and z (505) coordinate axes are illustrated in a 3D space. In some implementations, the information item is a 3D model.

As shown in FIG. 5, the orientation and location of the information item in the 3D space are represented by a vector 507. The orientation and location of the computing device in the 3D space are represented by a vector 509.

In one example, a specific way of calculating the whether each of the location and the orientation difference between the information item and the computing device is smaller than a predetermined value is illustrated in as follows in partial pseudo codes:

(1) Obtain the 3D coordinate position for the computing device as v=(x,y,z);

(2) Obtain the 3D coordinate position for the information item as 3d=(x,y,z);

(3) Calculate the vector of the computing device 509 on the Y plane as vY1=new THREE.Vector2(v.x, v.z);

(4) Calculate the vector of the information item 507 on the Y plane as vY=new THREE.Vector2(3d.x, 3d.z);

(5) Calculate the angle difference on the Y plane between the computing device and the information item dtY=vY1.angle( )-vY2.angle( );

(6) If the angle difference dtY on the Y plane is within a predetermined threshold, the computing device vector 209 and the information item vector 207 are aligned on the Y plane.

(7) Similarly, calculate the vector of the computing device 509 on the X plane as vX1=new THREE.Vector2(v.y, v.z);

(8) Calculate the vector of the information item 507 on the X plane as vX2=new THREE.Vector2(3d.y, 3d.z);

(9) Calculate the angle difference on the X plane between the computing device and the information item dtX=vX1.angle( )vX2.angle( );

(10) If the angle difference dtX on the X plane is within a predetermined threshold, the computing device vector 509 and the information item vector 507 are aligned on the X plane.

(11) If both the angle differences dtY on the Y plane and dtX on the X plane are within a predetermined threshold, the computing device vector 509 and the information item vector 507 are aligned with each other in the 3D space.

Figure 6:
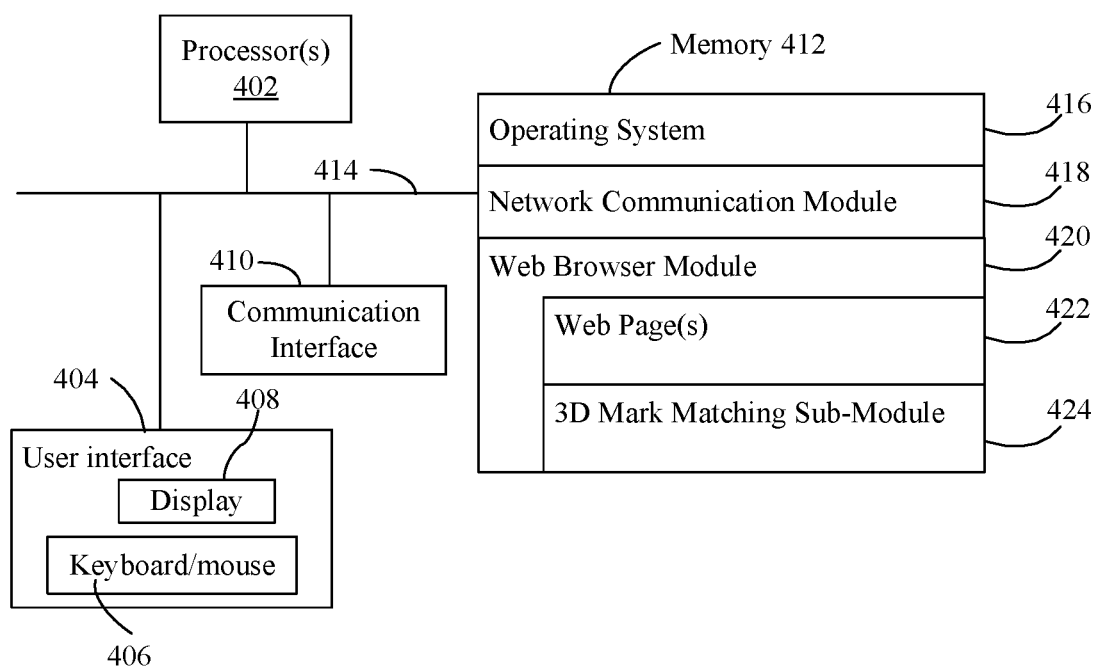
FIG. 6 is a schematic structural diagram of components of a computing device for browsing a web page in accordance with some implementations of the present application.

FIG. 6 is a schematic structural diagram of components of a computing device for browsing a web page in accordance with some implementations of the present application. The computing device 200 includes one or more processors 402 for executing modules, programs and/or instructions stored in memory 412 and thereby performing predefined operations; one or more network or other communications interfaces 410; memory 412; and one or more communication buses 414 for interconnecting these components. In some implementations, the computing device 25 includes a user interface 404 comprising a display device 408 and one or more input devices 406 (e.g., keyboard or mouse). In some implementations, the memory 412 includes high-speed random access memory, such as DRAM, SRAM, or other random access solid state memory devices. In some implementations, memory 412 includes non-volatile memory, such as one or more magnetic disk storage devices, optical disk storage devices, flash memory devices, or other non-volatile solid state storage devices. In some implementations, memory 412 includes one or more storage devices remotely located from the processor(s) 402. Memory 412, or alternately one or more storage devices (e.g., one or more nonvolatile storage devices) within memory 412, includes a non-transitory computer readable storage medium. In some implementations, memory 412 or the computer readable storage medium of memory 412 stores the following programs, modules and data structures, or a subset thereof:

an operating system 416 that includes procedures for handling various basic system services and for performing hardware dependent tasks;

a network communications module 418 that is used for connecting the computing device 25 to other computers via the communication network interfaces 410 and one or more communication networks (wired or wireless), such as the Internet, other wide area networks, local area networks, metropolitan area networks, etc.; and a web browser module 420 for browsing a web page on the display 408, the module further including one or more web pages 422, each including one or more 3D area marks, and a 3D Mark Matching Sub-Module 424 invoked by the module for determining whether another web page should be rendered in replacement of the current web page.

In the implementations of the present application, the computing device can comprise one or more processors and suitable memory. In the memory, suitable software programs for performing one or more steps of the present application are stored. Alternatively, the steps of the present application can be implemented in hardware, e.g. in an application-specific integrated circuit (ASIC). The present application can also comprise instructions on a non-transitory computer-readable medium, and the instructions can be executed by one or more processors. Each step of the present application can be implemented as a hardware component or, alternatively, as software, e.g. running on one or more processors of each step.

In sum, the present application is disclosed with the exemplary implementations in the foregoing, but the exemplary implementations are not intended to limit the present application. Various variations and modifications made by persons of ordinary skill in the art without departing from the spirit and the scope of the present application fall within the scope of the present application. Therefore, the protection scope of the present application is subject to the appended claims.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for browsing a web page using a computing device having a display, one or more processors and memory storing one or more programs for execution by the one or more processors, comprising:

rendering, on the display, a first web page including a plurality of information items, wherein each information item corresponds to a 3D object having a fixed location and a fixed orientation in a 3D space and is linked to a second web page;

displaying, on the display, an interested area mark at a fixed position on the display, the interested area mark having a predefine size, a variable location and a variable orientation relative to each 3D object in accordance with a current orientation of the computing device in the 3D space;

in response to a movement of the computing device and while displaying the interested area mark at the fixed position on the display:

determining current location and orientation of the interested area mark in the 3D space when the interested area mark overlaps with a first information item of the plurality of information items;

measuring a location difference and an orientation difference between the current location and orientation of the interested area mark and the location and orientation of the 3D object corresponding to the first information item in the 3D space; and in accordance with a determination that each of the location difference and the orientation difference is within a respective threshold for a predefined time period: rendering, on the display, the second web page associated with the 3D object in replacement of the first web page.

2. The method of claim 1, further comprising:

in response to the movement of the computing device, updating display of the plurality of information items of the first web page on the display.

3. The method of claim 1, further comprising:

in accordance with the movement of the computing device, moving the interested area mark in an opposite direction within the 3D space to a direction of the current orientation of the computing device.

4. The method of claim 1, wherein the determination that each of the location difference and the orientation difference is within the respective threshold for the predefined time period comprises determining that the computing device is held substantially steady for the predefined time period.

5. The method of claim 1, wherein the first web page comprises a 3D (three-dimensional) webpage.

6. The method of claim 1, wherein the first web page comprises a multimedia content.

7. The method of claim 1, wherein the first information item comprises at least one of: a textual content and an image.

8. The method of claim 1, wherein when the interested area mark overlaps with the first information item, the first information item is displayed within the predefined size of the interested area mark.

9. The method of claim 1, wherein when the interested area mark overlaps with the first information item, the first information item is displayed at a size larger than the predefined size of the interested area mark.

10. The method of claim 1, wherein the first information item comprises a first shape and a second shape, the first shape changing into the second shape in accordance with a determination that each of the location difference and the orientation difference between the interested area mark and the first shape is within the respective threshold for a first predefined time period.

11. The method of claim 10, wherein rendering, on the display, the second web page further comprises rendering the second web page in accordance with a determination that each of the location difference and the orientation difference between the interested area mark and the second shape is within the respective threshold for a second predefined time period.

12. The method of claim 1, wherein the predefined time period is 3 seconds.

13. The method of claim 1, wherein displaying, on the display, the interested area mark further comprises:
varying a displaying characteristic of the interested area mark during the predefined time period, thereby indicating, to a user of the computing device, a length for which the computing device has been held substantially stable.

14. A computing device, comprising:
a display;
one or more processors; and
memory having instructions stored thereon, which when executed by the one or more processors cause the processors to perform operations comprising:
rendering, on the display, a first web page including a plurality of information items, wherein each information item corresponds to a 3D object having a fixed location and a fixed orientation in a 3D space and is linked to a second web page;
displaying, on the display, an interested area mark at a fixed position on the display, the interested area mark having a predefine size, a variable location and a variable orientation relative to each 3D object in accordance with a current orientation of the computing device in the 3D space;
in response to a movement of the computing device and while displaying the interested area mark at the fixed position on the display:
determining current location and orientation of the interested area mark in the 3D space when the interested area mark overlaps with a first information item of the plurality of information items;
measuring a location difference and an orientation difference between the current location and orientation of the interested area mark and the location and orientation of the 3D object corresponding to the first information item in the 3D space; and
in accordance with a determination that each of the location difference and the orientation difference is within a respective threshold for a predefined time period: rendering, on the display, the second web page associated with the 3D object in replacement of the first web page.

15. The computing device of claim 14, wherein the memory further has instructions stored thereon for:
in accordance with the movement of the computing device, moving the interested area mark in an opposite direction within the 3D space to a direction of the current orientation of the computing device.

16. The computing device of claim 14, wherein the determination that each of the location difference and the orientation difference is within the respective threshold for the predefined time period comprises determining that the computing device is held substantially steady for the predefined time period.

17. The computing device of claim 14, wherein the memory further has instructions stored thereon for:
in response to the movement of the computing device, updating display of the plurality of information items of the first web page on the display.

18. A non-transitory computer-readable medium, having instructions stored thereon, which when executed by one or more processors cause the processors to perform operations comprising:
rendering, on a display, a first web page including a plurality of information items, wherein each information item corresponds to a 3D object having a fixed location and a fixed orientation in a 3D space and is linked to a second web page;
displaying, on the display, an interested area mark at a fixed position on the display, the interested area mark having a predefine size, a variable location and a variable orientation relative to each 3D object in accordance with a current orientation of a computing device in the 3D space;
in response to a movement of the computing device and while displaying the interested area mark at the fixed position on the display:
determining current location and orientation of the interested area mark in the 3D space when the interested area mark overlaps with a first information item of the plurality of information items;
measuring a location difference and an orientation difference between the current location and orientation of the interested area mark and the location and orientation of the 3D object corresponding to the first information item in the 3D space; and
in accordance with a determination that each of the location difference and the orientation difference is within a respective threshold for a predefined time period: rendering, on the display, the second web page associated with the 3D object in replacement of the first web page.

19. The non-transitory computer-readable medium of claim 18, further comprising instructions stored thereon for:
in accordance with the movement of the computing device, moving the interested area mark in an opposite direction within the 3D space to a direction of the current orientation of the computing device.

20. The non-transitory computer-readable medium of claim 18, wherein the determination that each of the location difference and the orientation difference is within the respective threshold for the predefined time period comprises determining that the computing device is held substantially steady for the predefined time period.

* * * * *